US008120699B2

(12) United States Patent
Miyata

(10) Patent No.: US 8,120,699 B2
(45) Date of Patent: Feb. 21, 2012

(54) DIGITAL CAMERA FOR SHOOTING A PLURALITY OF IMAGES TO BE SYNTHESIZED TO FORM ONE IMAGE IN A SPECIAL SHOOTING MODE

(75) Inventor: Kazunori Miyata, Osaka (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 663 days.

(21) Appl. No.: 12/205,505

(22) Filed: Sep. 5, 2008

(65) Prior Publication Data
US 2009/0066814 A1 Mar. 12, 2009

(30) Foreign Application Priority Data

Sep. 6, 2007 (JP) ................................. 2007-231650

(51) Int. Cl.
H04N 5/222 (2006.01)
H04N 5/225 (2006.01)
(52) U.S. Cl. .... 348/371; 348/370; 348/372; 348/333.13
(58) Field of Classification Search ............. 348/333.13, 348/370–372
See application file for complete search history.

(56) References Cited

U.S. PATENT DOCUMENTS

| 5,721,987 | A |   | 2/1998 | Ozawa |  |
|---|---|---|---|---|---|
| 5,854,875 | A | * | 12/1998 | Yamagishi | 386/200 |
| 5,963,255 | A | * | 10/1999 | Anderson et al. | 348/372 |
| 5,966,553 | A |   | 10/1999 | Nishitani et al. |  |
| 6,233,016 | B1 | * | 5/2001 | Anderson et al. | 348/372 |
| 6,314,238 | B1 | * | 11/2001 | Imamura et al. | 396/6 |
| 6,314,239 | B1 | * | 11/2001 | Hata | 396/6 |
| 6,442,346 | B1 | * | 8/2002 | Constable et al. | 396/155 |
| 6,628,336 | B2 | * | 9/2003 | Hamamura | 348/371 |
| 7,187,858 | B2 | * | 3/2007 | Dowe et al. | 396/277 |
| 7,522,832 | B2 | * | 4/2009 | Liu et al. | 396/206 |

(Continued)

FOREIGN PATENT DOCUMENTS

| JP | 07-104375 A | 4/1995 |
|---|---|---|
| JP | 09-033981 A | 2/1997 |
| JP | 10-239749 A | 9/1998 |

(Continued)

OTHER PUBLICATIONS

Japanese Office Action dated Jun. 14, 2011, issued in corresponsing Japanese Patent Application No. 2007-231650.

Primary Examiner — Lin Ye
Assistant Examiner — Chia-Wei A Chen
(74) Attorney, Agent, or Firm — Westerman, Hattori, Daniels & Adrian, LLP

(57) ABSTRACT

A digital camera capable of setting a special shooting mode for shooting a plurality of images to be synthesized to form one image and comprises an imaging device, a strobe device, a storage unit temporarily storing at least one image shot by the imaging device, a shooting control circuit, an electrical battery serving as a power source, and a power source control circuit. The power source control circuit comprises a charge control unit charging the strobe device in a state where a temporary OFF mode is set, which stops electrical power supply to the imaging device, the storage unit and the shooting control circuit in the case that a strobe shooting is conducted, and the charge control unit charges the strobe device without the temporary OFF mode being set in the case that the strobe shooting is conducted in a state where the special shooting mode is set.

6 Claims, 5 Drawing Sheets

U.S. PATENT DOCUMENTS

| | | | |
|---|---|---|---|
| 7,616,882 B2 * | 11/2009 | Guthrie et al. | 396/205 |
| 7,683,965 B2 * | 3/2010 | Patino et al. | 348/370 |
| 7,773,147 B2 * | 8/2010 | Chuang | 348/372 |
| 2001/0036362 A1 * | 11/2001 | Hirai et al. | 396/159 |
| 2002/0008773 A1 * | 1/2002 | Akizuki et al. | 348/371 |
| 2003/0076438 A1 | 4/2003 | Ishimaru | |
| 2006/0244860 A1 * | 11/2006 | Nishimura | 348/372 |
| 2006/0250505 A1 * | 11/2006 | Gennetten et al. | 348/218.1 |
| 2008/0175580 A1 * | 7/2008 | Kita | 396/164 |

FOREIGN PATENT DOCUMENTS

| | | |
|---|---|---|
| JP | 2001-054008 A | 2/2001 |
| JP | 2001-148803 A | 5/2001 |
| JP | 2003-116031 A | 4/2003 |
| JP | 2003-125541 A | 4/2003 |
| JP | 2003-333404 A | 11/2003 |
| JP | 2004-088304 A | 3/2004 |
| JP | 2005-274823 A | 10/2005 |

* cited by examiner

DIGITAL CAMERA FOR SHOOTING A PLURALITY OF IMAGES TO BE SYNTHESIZED TO FORM ONE IMAGE IN A SPECIAL SHOOTING MODE

The priority application Number 2007-231650, upon which this patent application is based, is hereby incorporated by reference.

BACKGROUND OF THE INVENTION

1. Field of the Invention

The present invention relates to digital cameras capable of setting special shooting modes for shooting a plurality of images to be synthesized to form one image, such as a panorama shooting mode.

2. Description of Related Art

Conventionally, a digital camera capable of setting a panorama shooting mode has been known and FIG. 4 illustrates a structure of this kind of digital camera. This digital camera has a microcomputer 21. An operation unit 23 which has a plurality of buttons including a shutter button, an LCD 24 for displaying an image obtained by shooting, and a strobe device 25 are connected to the microcomputer 21. An ASIC (Application Specific Integrated Circuit) 22 having a CPU mounted thereon is connected to the microcomputer 21, the LCD 24, and the strobe device 25. An SDRAM 26 for temporarily storing image data, a shooting lens drive circuit 27, a CCD 28, a voice IC 29 and a card slot 30 of a memory card (not shown) are connected to the ASIC 22. Also, this digital camera includes an electrical battery 31 serving as a power source for the microcomputer 21, the ASIC 22, the LCD 24, the strobe device 25, the SDRAM 26, the lens drive circuit 27, the CCD 28, the voice IC 29 and the card slot 30 described above.

The microcomputer 21 described above receives an operation signal from the operation unit 23 and notifies the ASIC 22 in accordance with the operation signal as well as controlling electrical power supply from the electrical battery 31 to the microcomputer 21, the ASIC 22, the LCD 24, the strobe device 25, the SDRAM 26, the lens drive circuit 27, the CCD 28, the voice IC 29 and the card slot 30 that are comprising the camera, and charge of the strobe device 25. The ASIC 22 receives the notice from the microcomputer 21 and controls the operation of the LCD 24, the strobe device 25, the SDRAM 26, the lens drive circuit 27, the CCD 28, the voice IC 29 and the card slot 30.

In the digital camera described above, in a state where the panorama shooting mode is set, every time a user depresses the shutter button of the operation unit 23, the microcomputer 21 notifies the ASIC 22 of the depression and then image signals for one frame are loaded to the ASIC 22 from the CCD 28 to be converted into digital image data, and the image data is further subject to a predetermined signal processing and then stored in the SDRAM 26. Here, in the case that an AF (Auto Focus) function or an AE (Auto Exposure) function is set to ON, a shooting condition such as a focus distance, an exposure, and a light exposure time set for shooting a first image in the panorama mode is applied to shooting the subsequent images.

Then, when the panorama synthesis operation to the operation unit 23 is conducted by a user, one composite image is formed by synthesizing image data for a plurality of frames stored in the SDRAM 26 in the shooting operation described above, and then the image data of the formed composite image is recorded in the memory card. Here, the composite image can be formed not only on the digital camera, but also on a personal computer. In such a case, the image data for a plurality of frames obtained by shooting is recorded in the memory card without being synthesized, and then the image data for a plurality of frames is loaded into a personal computer from the memory card to be synthesized on the personal computer.

In the conventional digital camera described above, in the case that the remaining battery level is below a predetermined threshold level after a strobe shooting, during the strobe device is being charged, a temporary OFF mode is set, in which the electrical power supply to the components other than the microcomputer 21 and the strobe device 25 stops in order to save the power consumption.

FIG. 5 illustrates a control process executed by the microcomputer 21. First, in step S31, the microcomputer 21 monitors the shutter button to determine whether or not the shutter button is depressed. When it determines NO, it terminates the process. In contrast, when it determines YES, it notifies the ASIC 22 of the depression of the shutter button to make the ASIC 22 execute the shooting operation in step S32. After that, in step S33, it determines whether or not a strobe shooting is conducted, and when it determines NO, it terminates the process.

When the strobe shooting is conducted, it determines YES in step S33 and further determines whether or not the remaining battery level is below a predetermined threshold level Th in step S34. When it determines YES, it sets the temporary OFF mode in step S35, and then the process proceeds to step S36. When it determines NO in step S34, the process proceeds to step S36, bypassing step S35.

In step S36, it starts the charge of the strobe device and then it determines whether or not the strobe device is fully charged in step S37. When it determines NO, it repeats the process of step S37 until the strobe device is fully charged and it determines YES in step S37. Once it determines YES in step S37, it terminates the charge of the strobe device in step S38. Subsequently in step S39, it determines whether or not the temporary OFF mode is set and when it determines NO, it terminates the process. When it determines YES, it cancels the temporary OFF mode setting in step S40 and then terminates the process.

With the process described above, in the case that the remaining battery level is below the predetermined threshold level Th after the strobe shooting is conducted, the temporary OFF mode is set during the charge of the strobe device 25.

Thus, even if the conventional digital camera is capable of strobe shooting in a panorama mode, with this camera, when the remaining battery level falls below the predetermined threshold level during shooting a plurality of images to be synthesized to form one image, the temporary OFF mode would be set and therefore the power source of the ASIC 22 would be set to OFF. Therefore, it will be problematic because the same shooting condition cannot be maintained. In addition, the power source of the SDRAM 26 would also be set to OFF, and therefore, it will be also problematic because the image data stored in the SDRAM 26 can be deleted.

Accordingly, the conventional digital camera is designed so that the strobe shooting cannot be conducted in a state where the panorama shooting mode is set.

SUMMARY OF THE INVENTION

A digital camera in accordance with the present invention is capable of setting a special shooting mode for shooting a plurality of images to be synthesized to form one image and comprises an imaging device, a strobe device, a storage unit temporarily storing at least one image shot by the imaging device, a shooting control circuit for controlling a shooting operation of the camera, an electrical battery serving as a power source for the imaging device, the strobe device, the storage unit and the shooting control circuit, a power source control circuit for controlling electrical power supply from the electrical battery to the imaging device, the strobe device, the storage unit and the shooting control circuit as well as controlling charge of the strobe device, and the power source control circuit comprises a charge control unit charging the strobe device in a state where a temporary OFF mode is set, which stops the electrical power supply to the imaging device, the storage unit and the shooting control circuit in the case that the strobe shooting is conducted. Also, in a state where the special shooting mode is set, the charge control unit charges the strobe device without the temporary OFF mode being set in the case that the strobe shooting is conducted.

In the digital camera in accordance with the present invention described above, in a state where the special shooting mode is set, the temporary OFF mode is not set even in the case that the strobe shooting is conducted. Therefore, the power supply to the storage unit does not stop during shooting a plurality of images to be synthesized to form one image. Therefore, an image stored in the storage unit will not be deleted. In addition, the power supply to the shooting control circuit does not stop either. Therefore, it is possible to maintain the same shooting condition until the completion of shooting a plurality of images to be synthesized to form one image.

The special shooting mode is not limited to the panorama mode for shooting a plurality of images for a composite image which is formed by arranging the plurality of images in a longitudinal direction and/or a transverse direction. The special shooting mode also includes other different shooting modes, for example, a shooting mode for shooting two images for a composite image which is formed by synthesizing a part of one of the two images into the inside of the other image used as a frame of the composite image, or a shooting mode for shooting two images for a composite image which is formed by dividing the two images into a plurality of image parts respectively and arranging the plurality of image parts of the two images alternately both in a longitudinal direction and in a transverse direction in a manner similar to a checkered flag.

In particular, the shooting control circuit comprises a restrict unit restricting the temporary OFF mode setting operation by the charge control unit of the power source control circuit when the special shooting mode is set. Therefore, the strobe device is charged without the temporary OFF mode being set.

Further in particular, the shooting control circuit comprises a cancel unit cancelling the restricted status of the temporary OFF mode setting operation by the charge control unit of the power source control circuit when the special shooting mode setting is cancelled. This automatically cancels the restricted status of the temporary OFF mode setting operation without any operation by a user. In the case that a strobe shooting is conducted after that, the strobe device is charged in a state where the temporary OFF mode is set.

Still further in particular, the shooting control circuit comprises:

a remaining battery level detect unit detecting a remaining battery level;

a judging unit judging whether or not the remaining battery level detected by the remaining battery level detect unit is above a predetermined threshold level; and a mode setting unit setting a special shooting mode when the special shooting mode setting operation is conducted only in the case that the remaining battery level is determined to be above the predetermined threshold level by the judging unit.

Here, the predetermined threshold level is set to be a minimum remaining battery level or over to cover the electrical power required for the strobe shooting of a plurality of images to be synthesized to form one image.

In the particular configuration described above, the special shooting mode is set only in the case where the remaining battery level is above the predetermined threshold level. This prevents the situation where the remaining battery level declines during shooting a plurality of images to be synthesized to form one image and the image shooting is interrupted from occurring.

Yet further in particular, the shooting control circuit comprises a strobe control unit, in the case where a strobe shooting is conducted, maintaining the amount of luminescence of the strobe shooting and conducting the following strobe shooting in a state where the special shooting mode is set. Therefore, the plurality of images taken with the strobe shooting has the same brightness and thus a natural composite image can be formed by synthesizing the plurality of images with the same brightness.

As described, with the digital camera according to the present invention, it is possible to conduct a strobe shooting even in a special shooting mode, such as a panorama shooting mode, for shooting a plurality of images to be synthesized to form one image.

DETAILED DESCRIPTION OF THE INVENTION

An embodiment of the present invention is described in detail below with reference to the drawings.

Figure 1:
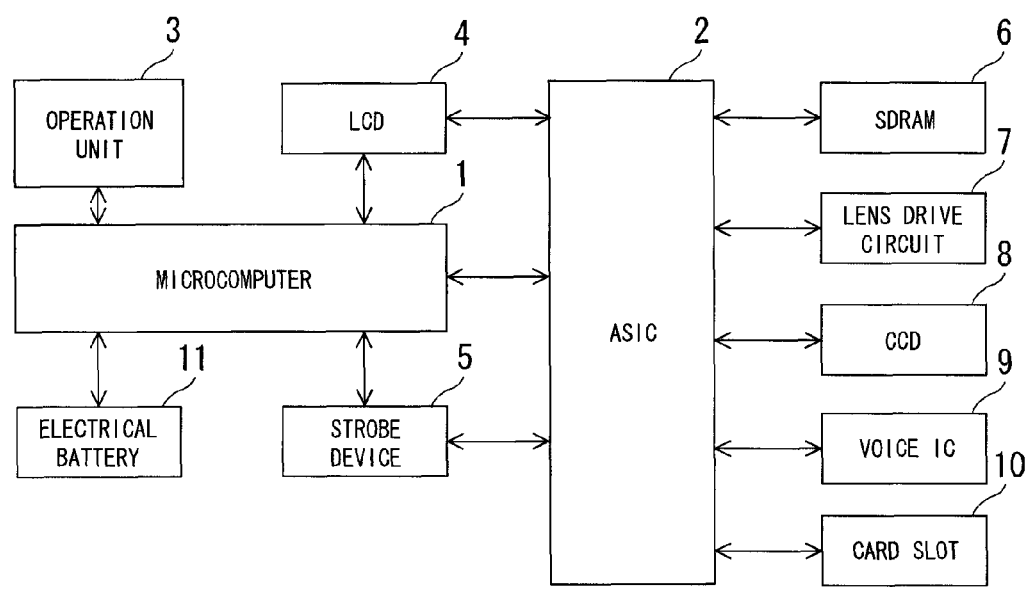
FIG. 1 is a block diagram illustrating a configuration of a digital camera according to the present invention.

A digital camera according to the present invention, as shown in FIG. 1, comprises a microcomputer 1. An operation unit 3 which has a plurality of buttons including a shutter button, an LCD 4 for displaying an image obtained by shooting, and a strobe device 5 are connected to the microcomputer 1. An ASIC 2 having a CPU mounted thereon is connected to the microcomputer 1, the LCD 4 and the strobe device 5. An SDRAM 6 for temporarily storing image data, a shooting lens drive circuit 7, a CCD 8, a voice IC 9 and a card slot 10 of a memory card (not shown) are connected to the ASIC 2. Also, the digital camera described above includes an electrical battery 11 serving as a power source for the microcomputer 1, the ASIC 2, the LCD 4, the strobe device 5, the SDRAM 6, the lens drive circuit 7, the CCD 8, the voice IC 9 and the card slot 10.

The microcomputer 1 described above receives an operation signal from the operation unit 3 and notifies the ASIC 2 in accordance with the operation signal as well as controlling electrical power supply from the electrical battery 11 to the microcomputer 1, the ASIC 2, the LCD 4, the strobe device 5, the SDRAM 6, the lens drive circuit 7, the CCD 8, the voice IC 9 and the card slot 10, and charge of the strobe device 5.

The ASIC 2 receives the notice from the microcomputer 1 and controls the operation of the LCD 4, the strobe device 5, the SDRAM 6, the lens drive circuit 7, the CCD 8, the voice IC 9 and the card slot 10.

With the digital camera according to the present invention, the microcomputer 1 detects the remaining level of the electrical battery 11 when a strobe shooting is conducted. In the case where the detected remaining battery level is below a first threshold level, it determines whether or not a temporary OFF mode setting is restricted, which stops the electrical power supply to the components other than the microcomputer 1 and the strobe device 5. In this embodiment, the first threshold level is set to be a remaining battery level slightly greater than a minimum remaining battery level to cover the electrical power required for the strobe shooting of around a dozen images. In addition, it is possible to set the first threshold level to be a few percent or dozens of percent of the battery capacity.

In a state where a normal shooting mode is set, which is for shooting one image, the microcomputer 1 determines that the temporary OFF mode setting is not restricted. Then, after setting the temporary OFF mode, the microcomputer 1 starts charging the strobe device 5. And then the microcomputer 1 cancels the temporary OFF mode setting upon completion of the charging of the strobe device 5. In contrast, in a state where the panorama shooting mode is set, the microcomputer 1 determines that the temporary OFF mode setting is restricted and conducts charging the strobe device 5 without setting the temporary OFF mode.

When the operation unit 3 is operated to set the panorama shooting mode, the microcomputer 1 detects the operation and notifies the ASIC 2 of the operation. The ASIC 2 receives the notice and detects the remaining level of the electrical battery 11. Only when the detected remaining battery level is above a second threshold level, the ASIC 2 sets the panorama shooting mode and then notifies the microcomputer 1 that the temporary OFF mode setting should be restricted. The microcomputer 1 receives the notice and sets the value of a flag of the temporary OFF mode restriction to show the restricted status. The second threshold level is set to be a remaining battery level slightly greater than a minimum remaining battery level to cover a required electrical power for the strobe shooting of the number of images well above a maximum number of images able to be synthesized to form one image. In this embodiment, the maximum number of images able to be synthesized to form one image is two. Therefore, the second threshold level is set to be the same value as the first threshold level, i.e. a remaining battery level slightly greater than a minimum remaining battery level to cover the electrical power required for the strobe shooting of around a dozen images.

When the shutter button is depressed in a state where the panorama shooting mode is set, the microcomputer 1 detects the depression and notifies the ASIC 2 of the depression. The ASIC 2 receives the notice and loads the image signals for one frame from the CCD 8 to convert them into digital image data. Then the ASIC 2 further conducts a predetermined signal processing on the image data and thereafter stores the image data in the SDRAM 6. The ASIC 2 conducts this shooting operation every time the ASIC 2 receives the notice from the microcomputer 1 that the shutter button is depressed. Here, in the case where the AF function or the AE function is set to ON, a shooting condition such as a focus distance, an exposure, and a light exposure time set for shooting a first image in the panorama mode is applied to the shooting of the subsequent images. By repeating the shooting operation in response to the depression of the shutter button as described above, image data for a plurality of frames are stored in the SDRAM 6.

Subsequently, when an operation is conducted for cancelling the panorama shooting mode setting, when the number of shot images reaches the maximum number for the panorama shooting, or when the remaining battery level falls below the minimum remaining battery level to cover the electrical power required for shooting images, the ASIC 2 notifies the microcomputer 1 that the restricted status of the temporary OFF mode setting should be cancelled, and then cancels the panorama shooting mode setting. The microcomputer 1 receives the notice and rewrites the value of the flag of the temporary OFF mode restriction to show the restriction cancelled status.

In addition, when the panorama synthesis operation is conducted thereafter, one composite image is formed from the image data for a plurality of frames stored in the SDRAM 6 as described above and the image data of the composite image is recorded in the memory card.

Figure 2:
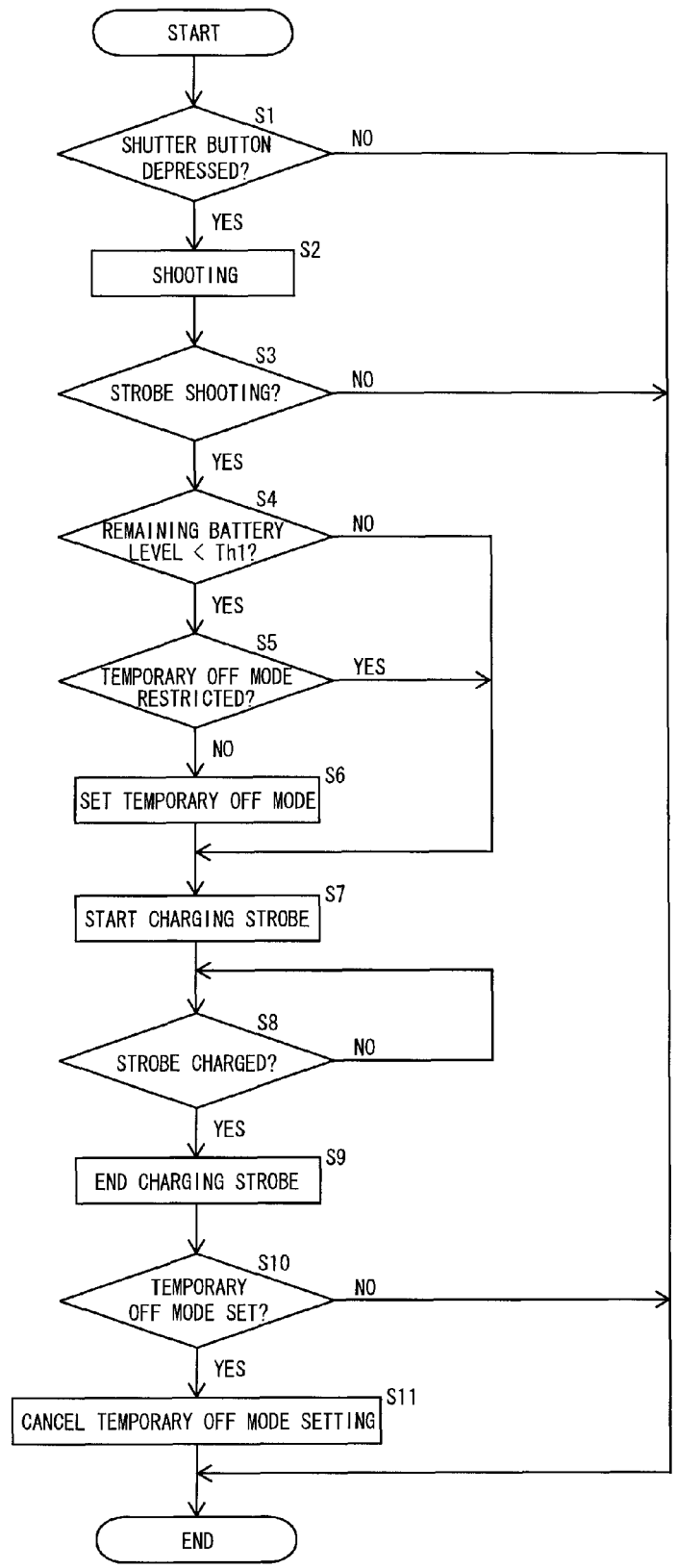
FIG. 2 is a flowchart showing a control process conducted by a microcomputer of the digital camera.

FIG. 2 shows a control process conducted by the microcomputer 1. First, in step S1, the microcomputer 1 monitors the shutter button to determine whether or not it is depressed. When it determines NO, it terminates the process and when it determines YES, it notifies the ASIC 2 of the depression of the shutter button to make the ASIC 2 conduct the shooting operation in step S2, and then it determines whether or not a strobe shooting is conducted in step S3. When it determines NO, it terminates the process.

When the strobe shooting is conducted and therefore the microcomputer 1 determines YES in step S3, it determines whether or not the remaining battery level is below the first threshold Th1 in step S4. When it determines YES, the process proceeds to step S5 and the microcomputer 1 determines whether or not the temporary OFF mode setting is restricted in accordance with the temporary OFF mode restriction flag. Here, when the normal shooting mode is set, the microcomputer 1 determines NO in step S5 and sets the temporary OFF mode in step S6 and then the process proceeds to step S7. In contrast, when the panorama shooting mode is set, the microcomputer 1 determines YES in step S5 and the process proceeds to step S7, bypassing step S6. When the remaining battery level is the first threshold level Th1 or over and therefore the microcomputer 1 determines NO in step S4, the process proceeds to step S7, bypassing steps S5 and S6.

After the microcomputer 1 starts charging the strobe device 5 in step S7, it determines whether or not the strobe device 5 is fully charged in step S8. When it determines NO, it repeats the process of step S8, and when the strobe device 5 is fully charged and therefore the microcomputer 1 determines YES in step S8, it terminates the charge of the strobe device 5 in step S9. Subsequently in step S10, it determines whether or not the temporary OFF mode is set. When it determines NO, it terminates the process, and when it determines YES, it cancels the temporary OFF mode setting in step S11 and terminates the process.

Figure 3:
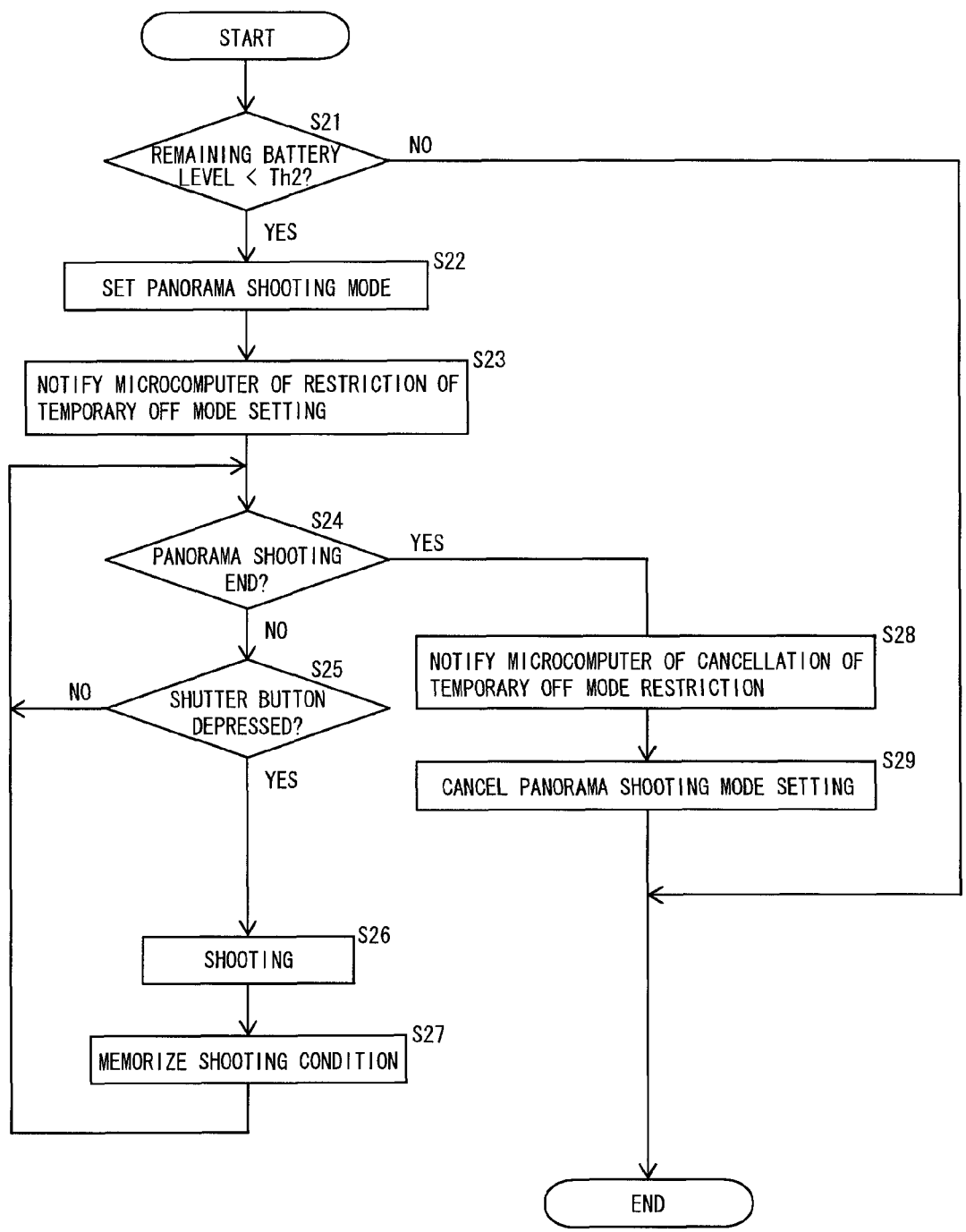
FIG. 3 is a flowchart showing a control process conducted by an ASIC of the digital camera.
Figure 4:
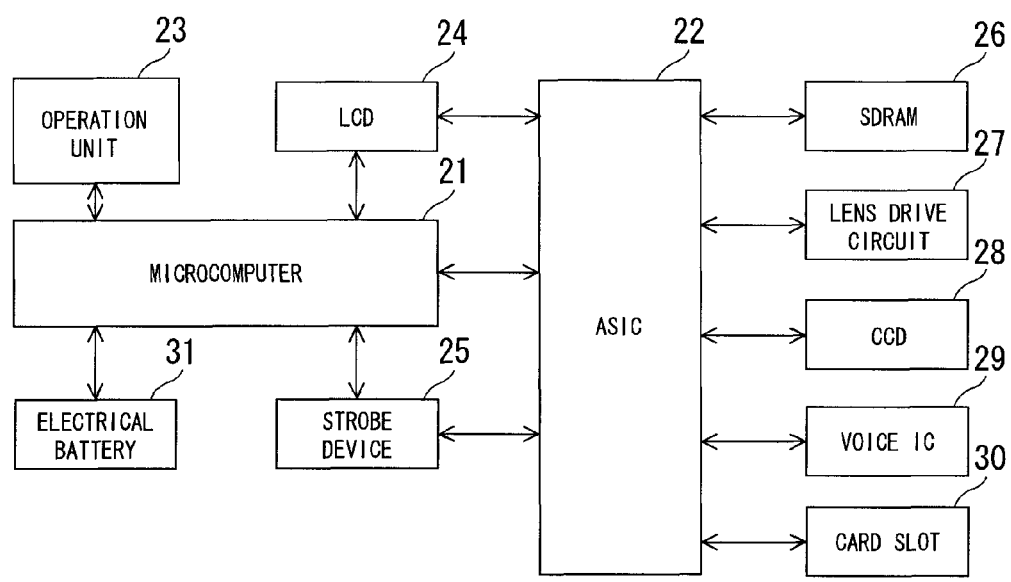
FIG. 4 is a block diagram illustrating a configuration of a conventional digital camera.
Figure 5:
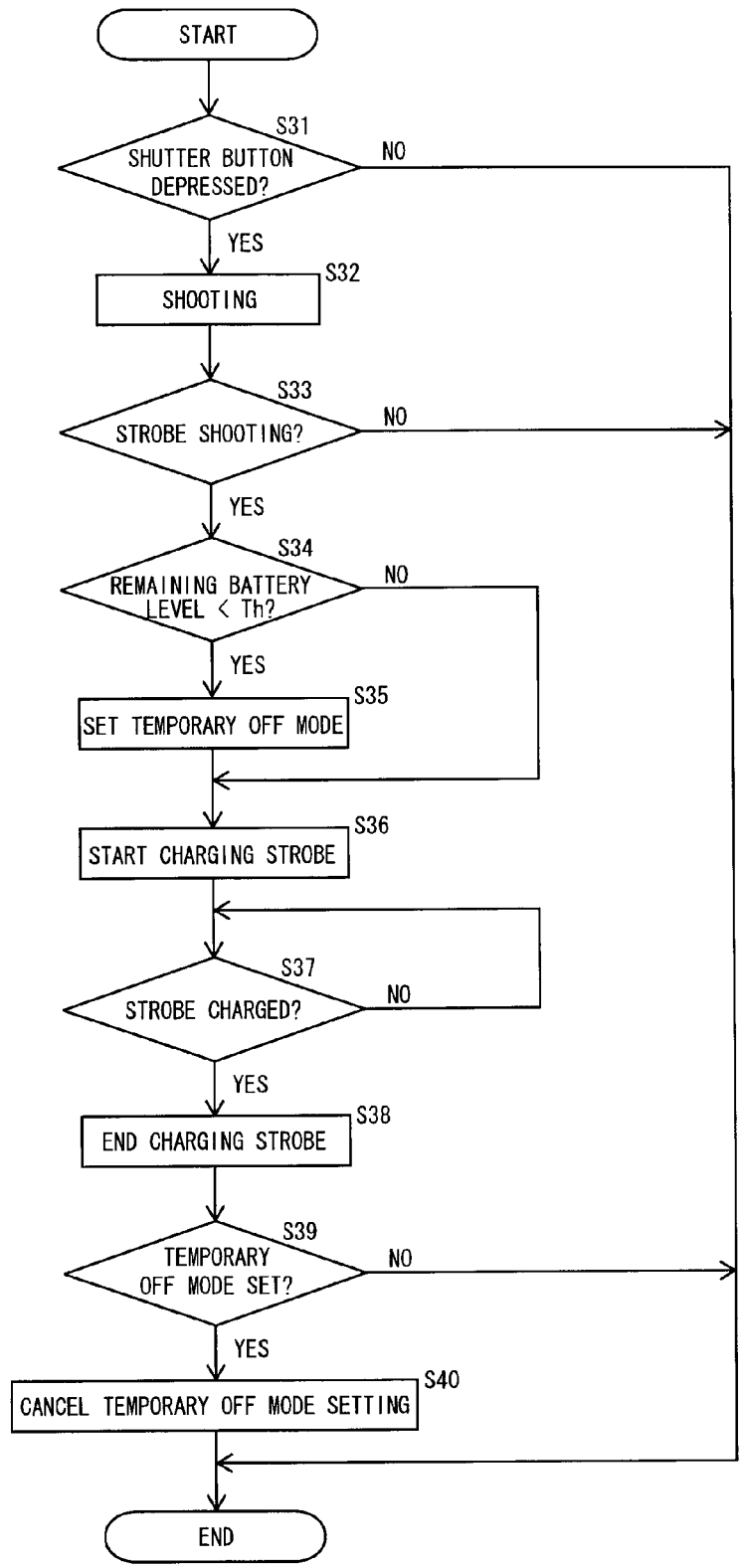
FIG. 5 is a flowchart showing a control process conducted by the microcomputer of the digital camera.

FIG. 3 shows a control process conducted by the ASIC 2 when the panorama shooting mode setting operation is conducted. Upon receipt of the notice from the microcomputer 1 that the panorama shooting mode setting operation is conducted, the ASIC 2 determines whether or not the remaining battery level is above the second threshold level Th2. When it determines NO, it terminates the process without setting of the panorama shooting mode, and in contrast, when it determines YES, it sets the panorama shooting mode in step S22.

Next in step S23, it notifies the microcomputer 1 that the temporary OFF mode setting should be restricted, and then it determines whether or not it should terminates the panorama shooting in step S24. When it determines NO in this step, the process proceeds to step S25. The ASIC 2 determines whether or not it receives the notice from the microcomputer 1 that the shutter button is depressed in step S25. When it determines NO, the process returns to step S24.

When the ASIC 2 receives the notice that the shutter button is depressed and therefore it determines YES in step S25, it conducts the shooting operation in step S26. Next in step S27, it memorizes the shooting condition such as the focus distance, the exposure, and the light exposure time set in step S26 and then returns to step S24. Here, in the case where the strobe shooting is conducted in step S26, the amount of luminescence is included in the shooting condition. Thereafter, when the shooting operation is conducted in step S26, the shooting condition memorized in step S27 is applied.

After repeating the shooting operation in response to the notice of the shutter button depression, when the ASIC 2 receives the notice that the operation for cancelling the panorama shooting mode setting is conducted by a user, when the number of shot images reaches the maximum number for the panorama shooting, or when the remaining battery level falls below the minimum remaining battery level to cover the electrical power required for shooting images, the ASIC 2 determines YES in step S24 and the process proceeds to step S28. After notifying the microcomputer 1 that the restricted status of the temporary OFF mode setting should be cancelled in step S28, the ASIC 2 cancels the panorama shooting mode setting in step S29 and then terminates the process.

In the digital camera in accordance with the present invention described above, when the panorama shooting mode setting operation is conducted, the panorama shooting mode is set only in the case where the remaining battery level is above the second threshold level Th2. And this prevents the situation where the remaining battery level declines during shooting a plurality of images to be synthesized to form one image and whereby the image shooting is interrupted from occurring.

In addition, since the temporary OFF mode is never set in the panorama shooting mode, the electrical power supply to the SDRAM 6 does not stop during shooting the plurality of images to be synthesized to form one image, and therefore, the image data stored in the SDRAM 6 will not be deleted. Also, the electrical power supply to the ASIC 2 does not stop either, and therefore, it is possible to maintain the shooting condition set for shooting the first image until the panorama shooting mode setting is cancelled.

Further, in the case where the strobe shooting is conducted in the panorama shooting mode, the same amount of luminescence as set in the first strobe shooting is applied to the subsequent strobe shooting. Therefore, a plurality of images with the same brightness can be obtained and thus a natural composite image can be formed by synthesizing the plurality of the images with the same brightness.

What is claimed is:

1. A digital camera capable of setting a normal shooting mode for shooting one image and a special shooting mode for shooting a plurality of images to be synthesized to form one image and comprising: an imaging device; a strobe device; a storage unit temporarily storing at least one image shot by the imaging device; a shooting control circuit for controlling a shooting operation of the camera;
an electrical battery serving as a power source for the imaging device, the strobe device, the storage unit and the shooting control circuit; and
a power source control circuit for controlling electrical power supply from the electrical battery to the imaging device, the strobe device, the storage unit and the shooting control circuit as well as controlling charge of the strobe device,
the power source control circuit comprising a charge control unit adapted to control charging in the case where a strobe shooting is conducted,
the charge control unit being operable in a manner that:
when the remaining battery level is above a predetermined threshold level, the charge control unit supplies electric power to the imaging device, the storage unit and the shooting control unit, and charges the strobe device;
when the remaining battery level is below a predetermined threshold level and the normal shooting mode is placed in an established state, the charge control unit activates a temporary OFF mode wherein the power supply is stopped to the imaging device, and charges the strobe device; and
when the remaining battery level is below a predetermined threshold level and the special shooting mode is placed in an established state, the charge control unit disactivates the temporary OFF mode and charges the strobe device.

2. The digital camera according to claim 1, wherein the shooting control circuit comprises a restrict unit restricting the temporary OFF mode setting operation by the charge control unit of the power source control circuit when the special shooting mode is set.

3. The digital camera according to claim 2, wherein the shooting control circuit comprises a cancel unit cancelling a restricted status of the temporary OFF mode setting operation by the charge control unit of the power source control circuit when the special shooting mode setting is cancelled.

4. The digital camera according to claim 1, wherein the shooting control circuit comprises:
a remaining battery level detect unit detecting a remaining battery level;
a judging unit judging whether or not the remaining battery level detected by the remaining battery level detect unit is above a predetermined threshold level; and
a mode setting unit setting a special shooting mode when the special shooting mode setting operation is conducted only in the case that the remaining battery level is determined to be above the predetermined threshold level by the judging unit.

5. The digital camera according to claim 4, wherein the predetermined threshold level is set to be a minimum remaining battery level or over to cover the electrical power required for the strobe shooting of a plurality of images to be synthesized to form one image.

6. The digital camera according to claim 1, wherein the shooting control circuit comprises a strobe control unit, in the case where a strobe shooting is conducted, maintaining the amount of luminescence of the strobe shooting and conducting the following strobe shooting in a state where the special shooting mode is set.

* * * * *